United States Patent

[11] 3,576,491

| [72] | Inventor | Richard D. Thornton<br>Concord, Mass. |
|---|---|---|
| [21] | Appl. No. | 751,878 |
| [22] | Filed | Aug. 12, 1968 |
| [45] | Patented | Apr. 27, 1971 |
| [73] | Assignee | Thornton Associates, Inc.<br>Waltham, Mass. |

[54] RESISTANCE MEASURING BRIDGE CIRCUIT INCLUDING OUTPUT GATING MEANS
5 Claims, 2 Drawing Figs.

[52] U.S. Cl. ..................................................... 324/62,
 323/75, 328/97
[51] Int. Cl. ...................................................... G01r 27/02
[50] Field of Search ........................................... 324/57 (B),
 60 (B), 62 (B), 57 (PI); 307/241, 253, 251, 304;
 328/95, 97; 323/75 (N); 318/20.750, 20.810

[56] References Cited
UNITED STATES PATENTS

| 3,076,338 | 2/1963 | Peltola ....................... | (324/62UX) |
|---|---|---|---|
| | | FOREIGN PATENTS | |
| 768,294 | 8/1964 | Canada ....................... | 324/57 |

*Primary Examiner*—Edward E. Kubasiewicz
*Attorney*—Cesari and McKenna

ABSTRACT: In a conductivity bridge a switching system is employed to allow only selected portions of the bridge output signal to pass through the output indicator meter. More specifically, initial portion of the signal waveform output, corresponding to the time during which the stray capacitance in the circuit is becoming fully charged, is prevented from passing through the meter, thereby eliminating the effect of such capacitance in the circuit and thus yielding a more accurate measurement of an unknown resistance.

Patented April 27, 1971

INVENTOR.
RICHARD D. THORNTON
BY
ATTORNEYS

# 3,576,491

RESISTANCE MEASURING BRIDGE CIRCUIT INCLUDING OUTPUT GATING MEANS

BACKGROUND OF THE INVENTION

1. Field of the Invention

This invention relates to a resistance measuring bridge circuit apparatus, and to the method employed for accurately determining the conductivity of a liquid. A means and method is described whereby errors in determining resistance or conductivity, heretofore caused by stray capacitance, are effectively eliminated.

2. Prior Art

Stray capacitance, which is inherent in all bridge circuits, presents the greatest obstacle encountered in trying to accurately determine the resistance or conductance of unknown liquids by means of an electrical bridge circuit.

When employing a direct current signal the stray capacitance may be eliminated but a more serious problem may result. That is, the direct current will cause electroplating as a result of ionization of the atoms in the liquid. An alternating current signal, with its rapidly changing polarity, eliminates this plating difficulty, but the AC signal is more responsive to stray capacitance and consequently results in measurement errors.

Some accurate measuring devices employ inductors in the circuit to tune out the stray capacitance. However, the proper tuning of the circuit is difficult to accurately control, and any variations in the circuit parameters will result in detuning the circuit. Therefore, this technique, although satisfactory when the circuit is properly tuned, is subject to inaccuracies due to uncontrollable variations in both external and internal parameters and must undergo continuous readjustment as such circuit parameters change.

OBJECTS OF THE INVENTION

A general object of the invention is to provide a low-cost apparatus and improved method for accurately measuring the resistance or conductance of a liquid.

Another object is to provide a resistance-measuring bridge circuit operable over a wide range of resistance values.

A still further object is to provide a battery-operated resistance-measuring bridge circuit which is entirely free from any power line interference.

Another object is to provide a compact, lightweight, and portable resistance-measuring bridge circuit particularly suitable for measuring the electrical resistance or conductivity of liquids.

BRIEF DESCRIPTION OF THE INVENTION

A switching system in combination with a direct current meter is used to measure the output current in a bridge circuit only during selected portions of a square wave AC bridge input, when a steady state prevails. These selected signal portions correspond to the positive and negative portions of the waveform during which the stray capacitance is in effect an open circuit, i.e., when the capacitance is effectively fully charged.

An input waveform having a constant value peak for a period of time greater than the time constant of the bridge circuit is required. This provides the distributed capacitance of the bridge circuit with enough time during each half-cycle to become fully charged. When this occurs, the bridge circuit is essentially capacitance-free and subsequently the output voltage of the bridge is a highly accurate representation of the resistance of the unknown liquid (or other resistive medium). A gating circuit applies the bridge output to an indicator only during these capacitance-free intervals and the indicator thus indicates the unknown resistance or conductance without capacitance-caused errors.

DETAILED DESCRIPTION

Figure 1:
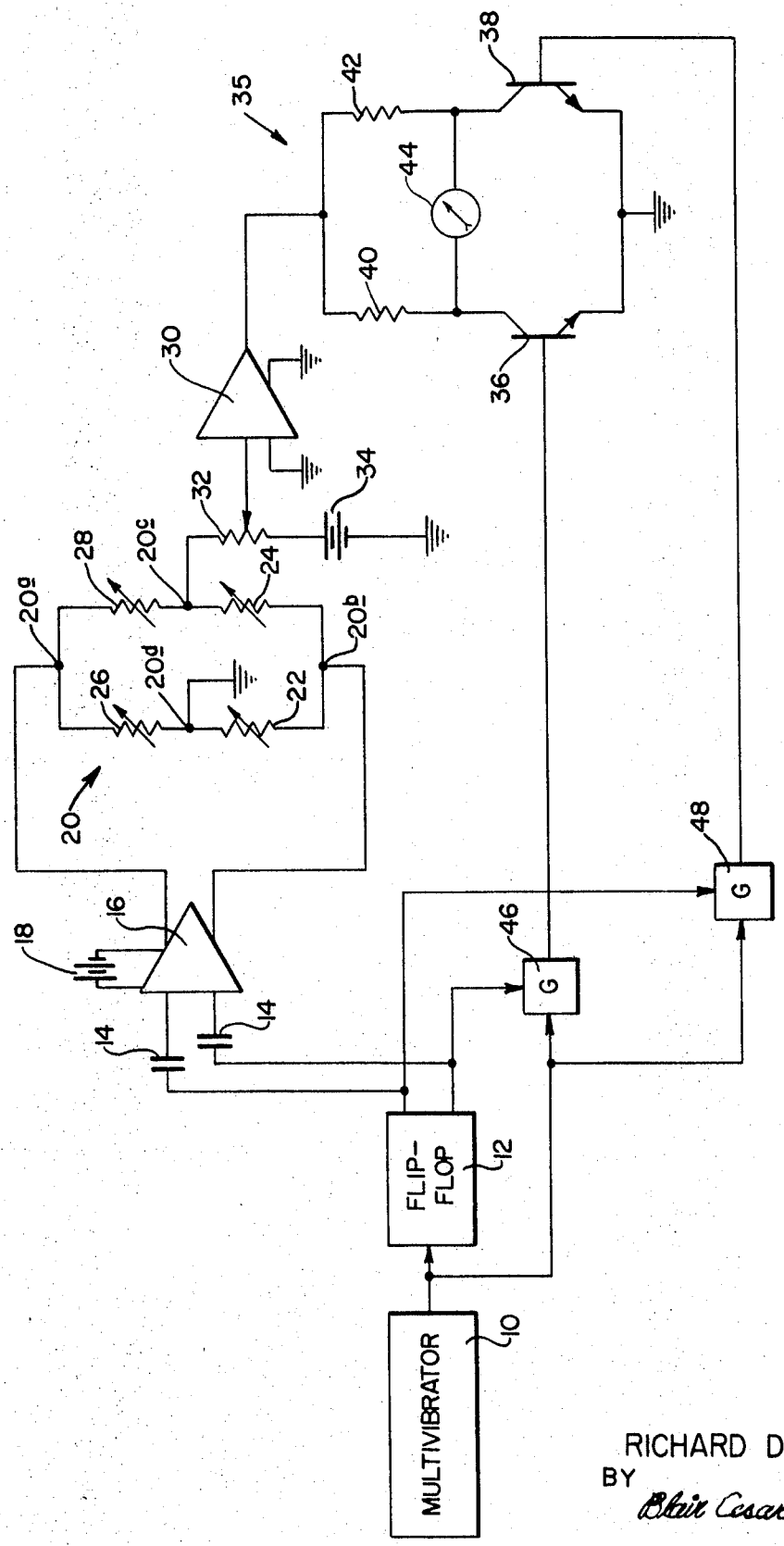
FIG. 1 of the drawings depicts a schematic diagram of the resistance-measuring bridge circuit of the invention.

Referring now in greater detail to FIG. 1, a multivibrator 10 generates a square wave signal that is applied to a flip-flop 12 connected to operate as a frequency divider. The flip-flop 12 thus provides a pair of square wave output signals of opposite phase at half the frequency of the multivibrator 10. These latter signals are applied through differentiating capacitors 14 to a triggered amplifier 16.

The amplifier 16 is essentially a polarity-reversing switch that connects a battery 18 to the input terminals 20a and 20b of a bridge circuit 20. By operating in step with the flip-flop 12, it provides a square wave input for the bridge circuit 20 that is in synchronism with the flip-flop 12 and yet has an amplitude V governed solely by the voltage of the battery 18.

The bridge circuit 20 includes the unknown resistance, indicated at 22, as well as standard resistors 24, 26 and 28. The resistance may, for example, be the resistance of a sample cell containing an electrolyte whose resistivity is to be measured. The resistor 24 is a calibrated variable resistor and the resistor 28 is a range switch in the preferred embodiment of the invention. The output (unbalance signal) of the bridge circuit, which appears between a terminal 20c and a grounded terminal 20d, is applied to a high-gain amplifier 30 by way of a potentiometer 32. A battery 34 connected between the lower end of the potentiometer 32 and ground shifts the bridge output voltage and in effect converts it to a square wave signal superimposed on a direct current signal. While this is not necessary for operation of the invention, it does minimize certain problems otherwise associated with the amplification and detection of the bridge unbalance signal. For example, it permits the use of a direct coupled amplifier, thereby eliminating the effects of coupling capacitors associated with AC amplifiers. Yet a drift in the amplifier is of no consequence inasmuch as the AC signal component representing the bridge unbalance is unaffected by amplifier drift, assuming that the period of the multivibrator 10 is short compared to the time for significant drift to take place.

The output of the amplifier 30 is applied to a synchronous detector 35 which indicates the presence and direction of any unbalance in the bridge circuit 20. The detector 35 includes transistors 36 and 38 whose collector-emitter conducting paths are in series with resistors 40 and 42 respectively between the output terminals of the amplifier 30. A zero center meter 44 is connected between the resistor-transistor junctions of the detector.

The transistors 36 and 38 are turned on during alternate half-cycles of the bridge circuit unbalance signal so that the current through the meter 44 flows in one direction through one half-cycle and in the opposite direction during the next half-cycle. Since the meter is an averaging device, its deflection corresponds to the difference in the output voltage of the amplifier 30 on alternate half-cycles. Additionally, since the polarity or phase of the unbalance signal depends on the direction of bridge unbalance, the direction of the meter deflection also corresponds to the direction of unbalance. Moreover, the transistors 36 and 38 are switched on only during the latter portions of the unbalance signal half-cycles and, in particular, they are switched on only after the various capacitances associated with the bridge circuit have been fully charged. The meter current is thus independent of these capacitances and is a function only of the bridge circuit resistances.

More specifically, the output of the multivibrator 10 is applied to a pair of gates 46 and 48 enabled by the respective outputs of the flip-flop 12. The gates 46 and 48, which are connected to the bases of the transistors 36 and 38 respectively thus turn on the transistors during the latter portions of alternate half-cycles of the square wave generated by the flip-flop 12.

Figure 2:
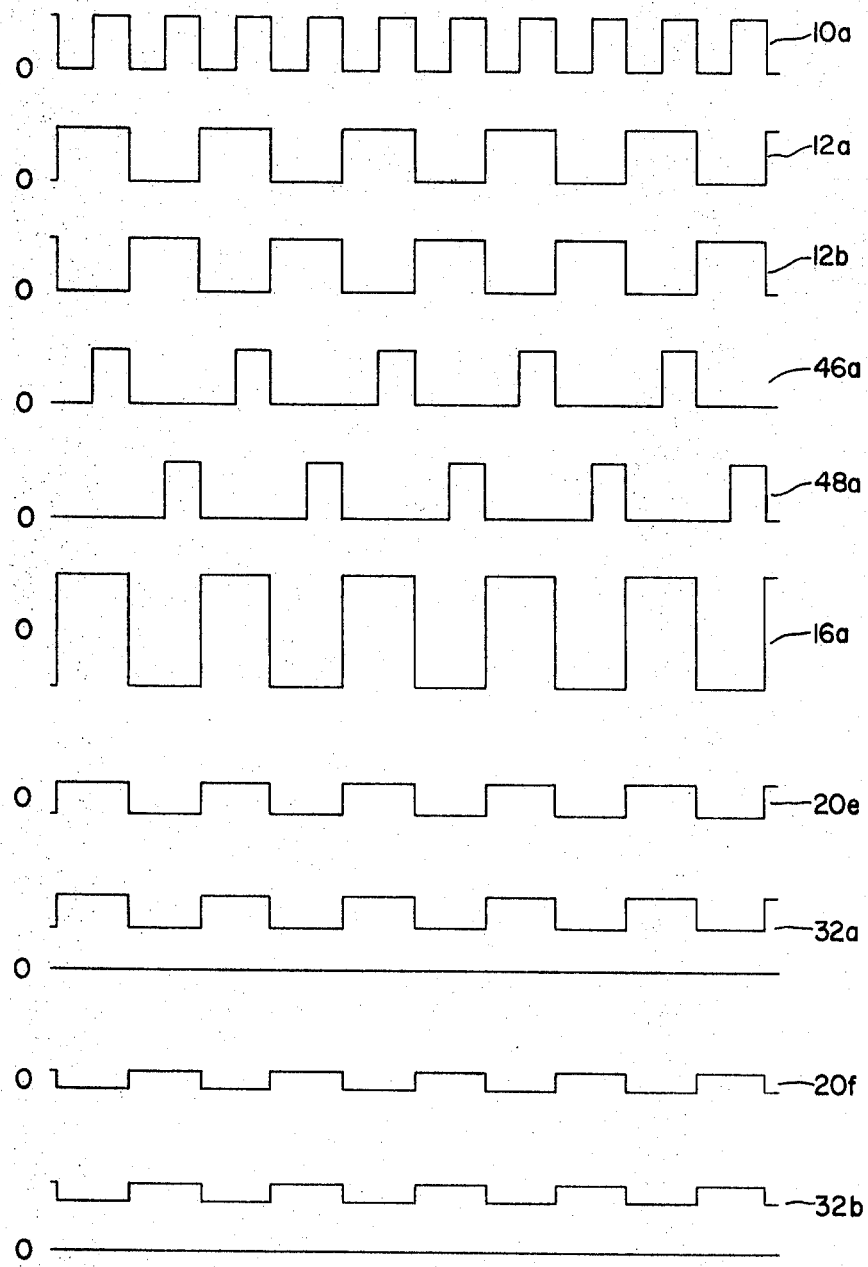
FIG. 2 is a graphic representation of the relation between the various waveforms in different portions of the circuit of FIG. 1.

The relationships of the various waveforms in the circuit are depicted in FIG. 2. These waveforms are shown for the case where there are no reactances in the bridge circuit. Inclusion of such reactances would alter the waveforms substantially, but only during the time when the meter is nonconducting. The output of the multivibrator 10 is represented by the waveform 10a and the outputs of the flip-flop 12 are shown at 12a and 12b. The coincidence of the positive portions of the waveforms 10a and 12a and the waveforms 10a and 12b respectively provide as outputs of the gates 46 and 48, a pair of signals shown at 46a and 48a. These latter signals have positive components during the second halves of alternate half-cycles of the signal 12a from the flip-flop 12 and the corresponding signal from the amplifier 16 shown at 16a. Thus, the transistor 36 is turned on during the latter portions of positive half-cycles of the amplifier 30 output and the transistor 38 is turned on during the latter portions of the negative half-cycles of this signal.

When the transistor 36 conducts, it establishes a current path through the meter 44 from right to left by way of the resistor 42. Conversely, when the transistor 38 conducts, current flows from left to right through the meter 44 by way of the resistor 40.

The resulting correspondence between the meter deflection and bridge unbalance will be readily understood by considering the waveforms associated with various bridge conditions. The waveform 20e, for example, represents the voltage between the bridge terminals 20c and 20d when the bridge is unbalanced in one direction and the waveform 32a represents the corresponding signal at the output of the potentiometer 32. This same waveform appears at the output terminals of the amplifier 30 and thus the meter 44 conducts more current during the half-cycles when the transistor 36 conducts than during those in which the transistor 38 conducts. The meter therefore registers a deflection to the left.

When the bridge is unbalanced in the opposite direction, its output has a reversed phase as indicated by the waveform 20f of FIG. 2. A corresponding waveform 32b is thus applied to the detector 32. In this case, the meter conducts more current in the half-cycles during which the transistor 38 conducts than those in which the transistor 36 conducts and therefore, it registers a rightward deflection. The direction of meter deflection thus indicates the direction of bridge unbalance and the amount of meter deflection, depending as it does on the difference in meter current during alternate half-cycles, indicates the degree of unbalance.

When the bridge circuit 20 is balanced by manipulation of the resistors 24 and 28, the bridge output voltage is zero and there is no alternating component in the output of the amplifier 30. The meter 44 then conducts equal currents during alternate half-cycles of the bridge input voltage and consequently the meter 44 has zero deflection.

The frequency of the multivibrator 10 should be low enough so that the various circuit reactances are substantially fully charged (or discharged) before the meter 44 conducts, i.e. before the second half of each half-cycle. The meter reading will then be independent of the effects of such reactances and will thereby accurately reflect the relationship of the bridge circuit resistances.

On the other hand, if the frequency is too low, one will encounter some of the undesirable effects associated with a direct current bridge circuit. For example, if the resistivity of an electrolyte is to be determined, undue depletion of the electrolyte may take place. Moreover, a drift in the amplifier 30 may present a problem. I have found that, for most purposes, a frequency of 400 Hz. avoids both extremes and is quite satisfactory for operation of the instrument.

For the bridge circuit input signal I prefer to use a waveform having a substantially flat top, e.g. a square wave. This permits the circuit reactances to charge up (or discharge) and remain in that condition during meter conduction. On the other hand, if the bridge input varies appreciably just before and during meter conduction, the meter current may be unduly dependent on the reactances, a condition that the invention is intended to largely eliminate. The circuit may, of course, be arranged for meter conduction during a shorter or larger interval than one-half of each half-cycle. However, in general, the circuit will have a simpler construction when it is connected as illustrated for half-time meter conduction.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention which, as a matter of language, might be said to fall therebetween.

I claim:
1. A resistance measuring circuit comprising
   A. bridge circuit
      1. including an unknown resistance to be measured,
      2. having a reactance associated therewith,
   B. means connected to apply to said bridge circuit as an input thereof a sequence of pulses having a constant peak for an interval greater than the time required for substantially fully charging the reactances associated with said bridge,
   C. output means, and
   D. gating means responsive to signals derived from said sequence of pulses for passing the output signal of said bridge to said output means only during a selected latter portion of each said interval after said reactance is substantially fully charged.
2. The circuit defined in claim 1
   A. in which said pulses are in the form of a square wave,
   B. in which said gating means passes said bridge output signal through said output means in a first direction during said portions of said square wave when said square wave has one polarity and in the opposite direction during said portions of said square wave when said square wave has the opposite polarity, and
   C. in which said output means responds to the difference in current therethrough during alternate half-cycles of said square wave.
3. The circuit defined in claim 2 including
   A. biasing means connected to convert the output of said bridge to a unidirectional signal by adding a DC level thereto.
   B. switching means arranged to connect said output means into said circuit in one direction during square wave half-cycles of one polarity and in the other direction during the other half-cycles of said square wave.
4. The circuit defined in claim 3 including a direct coupled amplifier connected between said biasing means and said output means.
5. The circuit defined in claim 3
   A. including a square wave generator,
   B. including a frequency divider connected to halve the frequency of said generator to provide said square wave input signal for said bridge,
   C. in which said switching means includes a pair of transistors connected to apply the output signal of said bridge circuit to said output means in opposite directions when they conduct, and
   D. including a pair of gates,
      1. enabled during alternate half-cycles of said square wave,
      2. to pass to the respective transistors the output of said multivibrator, thereby to cause said transistors to conduct during the latter halves of alternate half-cycles of said square wave signal.